US011295339B1

(12) United States Patent
Wu et al.

(10) Patent No.: US 11,295,339 B1
(45) Date of Patent: Apr. 5, 2022

(54) TRACKING USER CONVERSIONS ACROSS MOBILE APPLICATIONS AND BROWSERS

(71) Applicant: Google LLC, Mountain View, CA (US)

(72) Inventors: Ping Wu, Saratoga, CA (US); Anurag Agarwal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/107,612

(22) Filed: Nov. 30, 2020

Related U.S. Application Data

(63) Continuation of application No. 16/029,258, filed on Jul. 6, 2018, which is a continuation of application No. 12/821,762, filed on Jun. 23, 2010, now Pat. No. 10,019,731.

(51) Int. Cl.
*G06Q 30/02* (2012.01)

(52) U.S. Cl.
CPC .............................. *G06Q 30/0246* (2013.01)

(58) Field of Classification Search
CPC ................................................. G06Q 30/0246
USPC ...................................................... 705/14.45
See application file for complete search history.

(56) References Cited

U.S. PATENT DOCUMENTS

| | | | |
|---|---|---|---|
| 6,275,854 | B1 | 8/2001 | Himmel et al. |
| 7,873,734 | B1 | 1/2011 | Eidelman et al. |
| 2002/0120666 | A1 | 8/2002 | Landsman et al. |
| 2003/0055870 | A1 | 3/2003 | Smethers |
| 2004/0243466 | A1 | 12/2004 | Trzybinski et al. |
| 2005/0055269 | A1 | 3/2005 | Roetter et al. |
| 2006/0015404 | A1 | 1/2006 | Tran |
| 2006/0015405 | A1 | 1/2006 | Bala et al. |
| 2006/0100928 | A1 | 5/2006 | Walczak et al. |
| 2007/0174490 | A1 | 7/2007 | Choi et al. |
| 2007/0288317 | A1 | 12/2007 | Gupta et al. |
| 2008/0307317 | A1 | 12/2008 | Yohai-Giochais |
| 2009/0018913 | A1 | 1/2009 | Sarukkai et al. |
| 2009/0019153 | A1 | 1/2009 | Sebastian |

(Continued)

FOREIGN PATENT DOCUMENTS

| | | | |
|---|---|---|---|
| WO | WO 2007127043 | 11/2007 | |
| WO | WO-2007127043 A1 * | 11/2007 | ............. G06Q 20/40 |

OTHER PUBLICATIONS

Pierre Chappaz, Why Cookies Are Better for Users Than Social Data, 2010 (Year: 2010).*

(Continued)

*Primary Examiner* — Tarek Elchanti
(74) *Attorney, Agent, or Firm* — Fish & Richardson P.C.

(57) ABSTRACT

In general, this specification relates to content presentation. In general, one aspect of the subject matter described in this specification can be embodied in methods that include the actions of presenting an ad within a mobile application interface of a mobile device; receiving a user selection of the ad; determining that a browser session is to be initiated in response to the user selection of the ad; generating a request URL, using one or more processors, where the request URL includes a device identifier for the mobile device; and submitting the URL request using the browser including: determining whether an ad cookie associated with the ad exists on the browser, and if the cookie associated with the ad exists, sending an ad cookie identifier along with the request. Other embodiments of this aspect include corresponding systems, apparatus, and computer program products.

18 Claims, 4 Drawing Sheets

(56) References Cited

U.S. PATENT DOCUMENTS

| | | |
|---|---|---|
| 2009/0144159 A1 | 6/2009 | Bashyam |
| 2009/0197580 A1 | 8/2009 | Gupta et al. |
| 2009/0234711 A1 | 9/2009 | Ramer et al. |
| 2009/0234713 A1 | 9/2009 | Bi et al. |
| 2009/0258637 A1 | 10/2009 | Liu et al. |
| 2009/0300066 A1 | 12/2009 | Guo et al. |
| 2011/0153411 A1 | 6/2011 | Levav et al. |
| 2011/0185016 A1 | 7/2011 | Kandasamy et al. |
| 2011/0321167 A1 | 12/2011 | Wu |

OTHER PUBLICATIONS

Techweb, Understanding Authentication, Authorization, and Encryption, 2002 (Year: 2002).*

Browser and Mobile Analytics (Year: 2009).

\* cited by examiner

TRACKING USER CONVERSIONS ACROSS MOBILE APPLICATIONS AND BROWSERS

CROSS-REFERENCE TO RELATED APPLICATIONS

This application is a continuation of and claims priority to U.S. application Ser. No. 16/029,258, filed on Jul. 6, 2018, which is a continuation of and claims priority to U.S. application Ser. No. 12/821,762, now U.S. Pat. No. 10,019,731, filed on Jun. 23, 2010. The disclosure of each of the foregoing applications is incorporated herein by reference.

BACKGROUND

The present disclosure relates to content presentation.

Advertisers provide advertisements in different forms in order to attract consumers. An advertisement ("ad") is a piece of information designed to be used in whole or part by a user, for example, a particular consumer. Ads can be provided in electronic form. For example, online ads can be provided as banner ads on a web page, as ads presented with search results, or as ads presented in a mobile application.

One can refer to the inclusion of an ad in a medium, e.g., a web page or a mobile application, as an impression. An advertising system can include an ad in a web page, for example, in response to one or more keywords in a user search query input to a search engine. If a user selects the presented ad (e.g., by "clicking" the ad), the user is generally taken to another location associated with the ad, for example, to another, particular web page.

SUMMARY

In general, this specification relates to content presentation.

In general, one aspect of the subject matter described in this specification can be embodied in methods that include the actions of presenting an ad within a mobile application interface of a mobile device; receiving a user selection of the ad; determining that a browser session is to be initiated in response to the user selection of the ad; generating a request URL, using one or more processors, where the request URL includes a device identifier for the mobile device; and submitting the URL request using the browser including: determining whether an ad cookie associated with the ad exists on the browser, and if the cookie associated with the ad exists, sending an ad cookie identifier along with the request. Other embodiments of this aspect include corresponding systems, apparatus, and computer program products.

These and other embodiments can optionally include one or more of the following features. The method further includes receiving an ad cookie responsive to submitting the URL request; and storing the ad cookie on the browser, the ad cookie including an ad cookie identifier. The method further includes receiving a user request in the browser to access a location associated with the ad; and sending a request URL including the ad cookie identifier. The user ad selection is automatically executed in mobile browser. The user ad selection generates a user prompt to break out to mobile browser. The user ad selection results in a probabilistic determination of whether to open mobile browser. The probabilistic determination is limited by requirement to open mobile browser by a specified number of ad clicks.

In general, one aspect of the subject matter described in this specification can be embodied in methods that include the actions of receiving a URL request for a destination associated with a selected ad, the URL request including a device identifier; extracting, using one or more processors, the device identifier and generating a conversion cookie associated with the device identifier; generating an ad cookie associated with the device identifier; sending the ad cookie to the mobile device, the ad cookie having an ad cookie identifier; and redirecting the mobile device browser to a destination associated with the ad. Other embodiments of this aspect include corresponding systems, apparatus, and computer program products.

These and other embodiments can optionally include one or more of the following features. The method further includes receiving a second URL request for a destination associated with an ad, the URL request including the ad cookie identifier; determining that the ad cookie identifier is associated with the device identifier; using the device identifier to retrieve the conversion cookie; and using the conversion cookie to log a conversion event. The conversion cookie is stored in a table keyed by device identifier and a conversion tracking identifier. Determining that the ad cookie identifier is associated with the device identifier includes using the ad cookie identifier to lookup a mapping of ad cookie identifiers and corresponding device identifiers.

Particular embodiments of the subject matter described in this specification can be implemented to realize one or more of the following advantages. Ads and associated conversions can be tracked across mobile applications and mobile browsers without sharing a cookie space. Server-side tracking of ad impressions and conversions is provided by using device identifiers for each mobile device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Content items can be presented on mobile devices within both mobile applications and web browsers. However, the two do not share cookie space between each other nor are cookies shared between different mobile applications. Thus, identifying or tracking a conversion occurring through a browser will not be associated with an earlier impression on in a mobile application. For example, if the user clicks on the content item in a mobile application and then later goes to the conversion site associated with the content item from their browser.

In order to track conversions across application and browser content item interactions, a mapping is generated between a device identifier and a browser cookie. In particular, a content item cookie is generated that maps the cookie identifier to the device identifier. The content item cookie is stored on the user browser even though the content item may have been selected in a mobile application interface.

Later when a user accesses the conversion location (e.g., the web page associated with the clicked on content item) to make a purchase or other conversion event, the identifier of the content item cookie is used to identify the corresponding device identifier. The device identifier is used to identify a conversion cookie for logging the conversion and associating that conversion with the earlier content item interaction.

While reference will be made below to advertising systems and methods, other forms of content including other forms of sponsored content can be managed, presented, and tracked in accordance with the description below.

Figure 1:
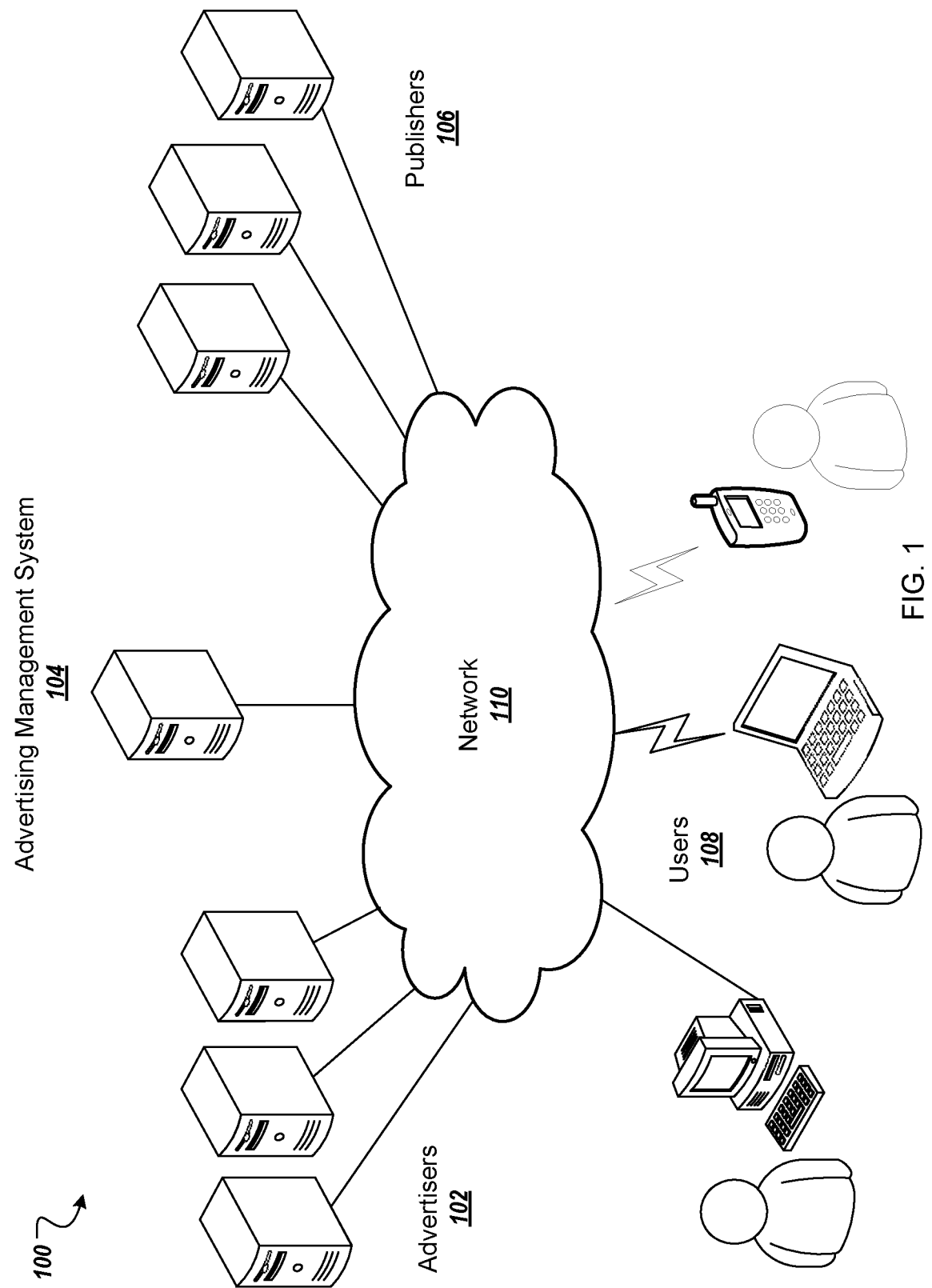
FIG. 1 is a block diagram of an example advertising system.

FIG. 1 is a block diagram of an example advertising system 100. In some implementations, one or more advertisers 102 can directly, or indirectly, enter, maintain, and track ad information in an advertising management system 104. Though reference is made to advertising, other forms of content, including other forms of sponsored content, can be delivered by the system 100. The ads can be in the form of graphical ads, such as banner ads, text only ads, image ads, barcode ads (e.g., ads including one or more barcodes for use in redeeming the ads), audio ads, video ads, ads combining one or more of any of such components, etc. The ads can also include embedded information, such as links, meta-information, and/or machine executable instructions.

One or more publishers 106 may submit requests for ads to the advertising management system 104. The advertising management system 104 responds by sending ads to the requesting publisher 106 for placement on or association with one or more of the publisher's content items (e.g., web properties). Example web properties can include web pages, television and radio advertising slots, and even print media space.

Other entities, such as users 108 and the advertisers 102, can provide usage information to the advertising management system 104, such as, for example, whether or not a conversion or click-through related to an ad has occurred. This usage information can include measured or observed user behavior related to ads that have been served. The advertising management system 104 can perform financial transactions, for example, crediting the publishers 106 and charging the advertisers 102 based on the usage information.

A computer network 110, such as a local area network (LAN), wide area network (WAN), the Internet, or a combination thereof, connects the advertisers 102, the advertising management system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request. The content server can submit a request for ads to an advertisement server in the advertising management system 104. The ad request can include a number of ads desired. The ad request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser can combine the requested content with one or more of the ads provided by the advertising management system 104. The combined content and ads can be sent to the users 108 that requested the content for presentation in a viewer (e.g., a browser or other content display system). The content server can transmit information about the ads back to the advertisement server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for ads to the advertising management system 104. The request can include a number of ads desired. This number can depend on the search results, the amount of screen or page space occupied by the search results, the amount of screen or page space available for the search results and the ads, the size and shape of the ads, etc. The request for ads can also include the query (as entered or parsed), information based on the query (such as geo-location information, whether the query came from an affiliate and an identifier of such an affiliate), and/or information associated with, or based on, the search results. The information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

In some implementations, the advertising management system 104 includes an auction process to select ads from the advertisers 102. For example, the advertisers 102 may be permitted to select, or bid, an amount the advertisers 102 are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the advertising management system 104. This combined information can then be forwarded to the users 108 that requested the content. The search results can be maintained as distinct from the ads, so as not to confuse the user between paid ads and presumably neutral search results.

In some implementations, one or more of the publishers 106 may submit requests for ads to the advertising management system 104. The advertising management system 104 responds by sending ads to the requesting publisher 106 for placement on one or more of the publisher's web properties (e.g., websites and other network-distributed content) that are relevant to the web property. For example, if one of the publishers 106 publishes a sports-related web site, the advertising management system 104 can provide sports-related ads to the publisher 106. In some other implementations, the requests are executed by devices associated with the user 108, e.g., by the execution of a javascript when the publishers web page is loading on a client device.

Another example publisher 106 is a mobile application developer. A mobile application is an application specifically designed for operation on a mobile device (e.g., a smartphone). The mobile application can also include one or more ads positioned within the content of the mobile application. Similarly to publishers 106, the ads can be received from the advertising management system 104 for placement in the mobile application when accessed by a user (e.g., when a particular page of a mobile application is loaded on the mobile device). Mobile applications are described in greater detail below with respect to FIG. 2.

Figure 2:
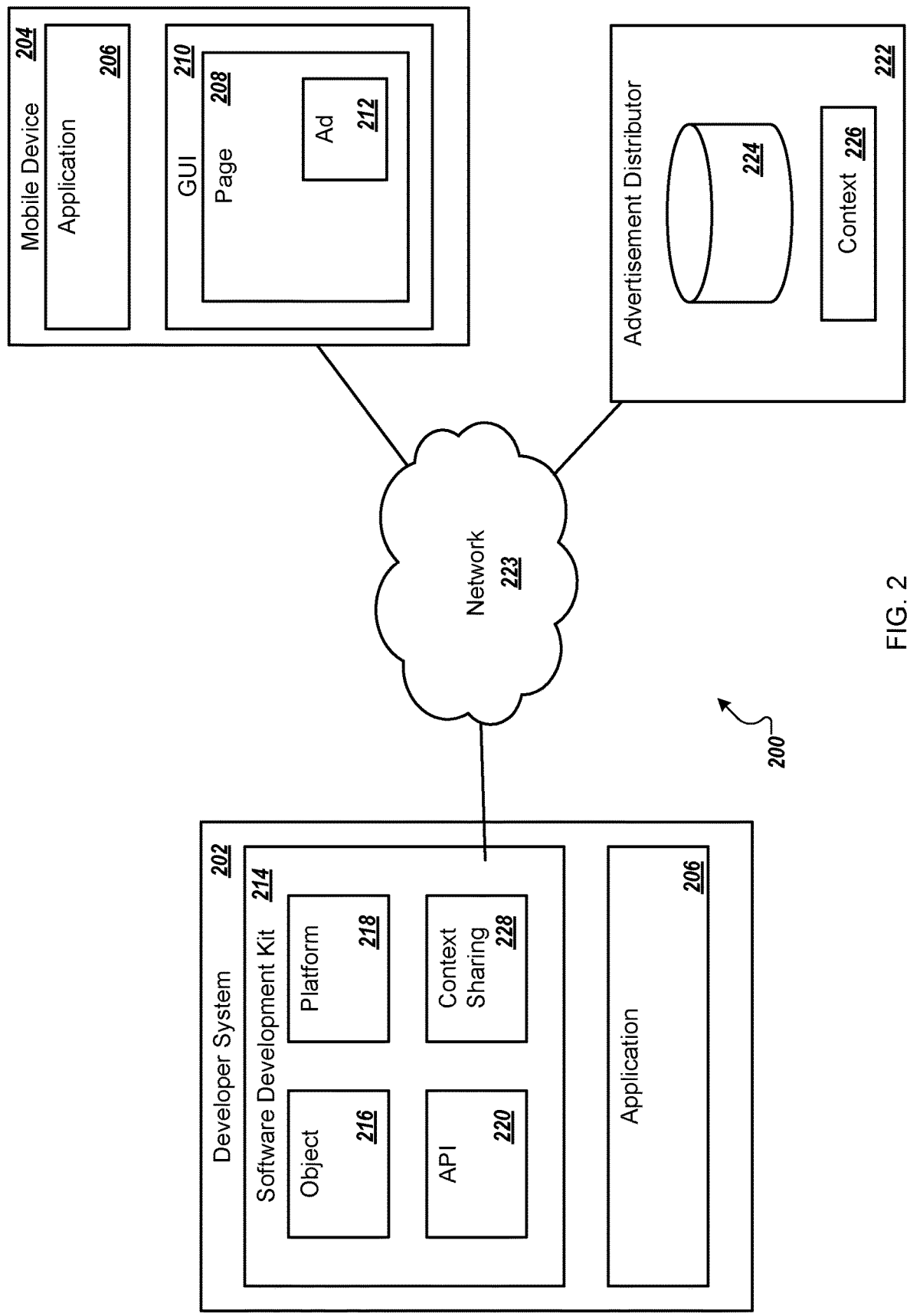
FIG. 2 is a block diagram of an example system including a mobile device application.

FIG. 2 is a block diagram of an example of a system 200 including a mobile device application. In this example, a developer system 202 can be used by a developer to create program content such as applications for one or more mobile devices 204. The mobile devices 204 can include, for example, a cellular telephone, a personal digital assistant or any other type of mobile device. Particularly, the developer can create an application 206 such as by generating program code and compiling it into an executable program compatible with the mobile device 204. The application 206 can be formulated so that it presents one or more pages 208 in a graphical user interface 210 of the mobile device 204, such as on a display screen. Individual systems and/or components can be implemented using hardware, firmware, software, or combinations thereof, and can be divided or joined into different number of units. Examples below will illustrate how the developer can configure the application 206 so that content 212, for example, as an advertisement from a third party, can be presented on the page(s) 208 when the application 206 is being executed.

A software development kit 214 can be provided to the developer for creating the application 206 and/or other programs. The software development kit 214 can provide editors for code and/or pseudocode, one or more compiling functions, emulating functions for previewing display content, and a debugging function, to name just a few examples. In some implementations, the software development kit 214 can also be configured to provide the developer a convenient way of adding third-party content such as advertisements to a program created for mobile devices. For example, the software development kit 214 can provide the developer with the necessary code and/or other application content so that advertisements are requested, displayed to a user, and that any interaction between the user and the ad is tracked.

The software development kit 214 can provide one or more objects 216. In some implementations, the developer can incorporate the object 216 in the code when creating the application. For example, the software development kit 214 can provide the object(s) 216 on a screen, such as where the developer generates the overall application content, in a way that the developer can select the object and include the corresponding material in the application 206 as it is being created.

The software development kit 214 can be configured so that the application(s) 206 can be created according to a particular platform 218. In some implementations, the platform 218 can be targeted to mobile devices, such as to the type of the mobile device 204 which can include a cell phone, a handheld device, or a personal digital assistant, to name just a few examples. For example, the platform 218 can be a platform created or supported by the Open Handset Alliance. In some implementations, the object 216 is included before the application code is compiled into an executable program. For example, the object can be incorporated as an integrated part of the application by inserting code before compilation.

The object 216 can perform one or more functions. In some implementations, the object can cause third party content such as the advertisement(s) 212, to appear on the mobile device 204. For example, the object 216 can be responsible for requesting relevant ad(s), displaying the ad(s) in the right manner to the user, and tracking whether the user clicks on the ad or otherwise interacts with the ad.

In some implementations, the object 216 is a Java object that is configured to be added to a user interface of the application 206 and handle fetching and rendering of, and interaction with, content such as advertisements. For example, the developer can implement a view object that extends a view class associated with the application 206. In some implementations, an advertising view object could include the following: GoogleBaseAdView(String client).

This object can represent a base class to create an advertisement view. A constructor can set the client parameter in a content ads request that can include a URL for a frontend involved in content requests. The above object can extend a more general view class, such as a WebView class used in some implementations from Google Inc. and can in some implementations be extended by other more specific classes directed at advertising. In some examples, such an extension can use void setAdLayoutType(int placement) to specify top and/or bottom placement of the view that requests the content. Other ways of displaying the content (e.g., an ad) can be used, such as a gallery that places thumbnails of image content in a gallery view.

One or more functions can be used with the object. Such function(s) can customize the look and feel of the content when it is displayed. In some implementations, such function(s) can set one or more CGI parameters in a content request.

An application program interface (API) 220 can be used with the object 216. In some implementations, the API is a Java API that a developer can call when incorporating content such as advertisements into the application 206. For example, the object 216 can include a Java code snippet that uses the Java API 220 so that the developer can insert the code into the application 206. As noted earlier, such a code snippet can construct a request for content such as an ad based on a developer's customization, fetch the content and write it to the user interface of the application 206.

The ad 212 can include a number of different types of content. In some implementations, ad types including, but not limited to, text ads, image ads (including static and animated images) and video ads can be used. For example, the ad can provide for user navigation (e.g., a link) to other content associated with the advertiser. Other types of content are possible (e.g., non-advertising content).

An advertisement distributor system 222 can be used to forward any type of content such as the ad 212 to the mobile device 204 and/or the developer system 202. In some implementations, the advertisement distributor system 222 is configured to receive request(s) for content from the mobile device 204, fetch one or more matching ads or other content from a repository 224, and forward the matching content to the mobile device 204. For example, the matching of the ad 212 can be performed using a context component 226 that can provide one or more context parameters associated with the application 206 configured for identifying matching content/advertisements.

The developer system 202, the mobile device 204 and/or the advertisement distributor system 222 can be connected using any kind of network 223, such as the Internet. For example, the developer system 202 and the advertisement distributor system 222 can communicate using the TCP/IP suite of protocols and the mobile device 204 can communicate using any kind of wireless protocol, such as IEEE 802.11, WAP and/or Bluetooth.

Relevant context of the application 206 and/or the mobile device 204 can be shared in different ways. In some implementations, the developer can share context including metadata about the application 206 with the advertisement distributor system 222. A context sharing component 228 in the software development kit 214 can allow the developer to enter one or more keywords that the developer decides are relevant for retrieving and presenting content such as advertisements. For example, the developer who creates the application can submit the keyword(s) using the context sharing component 228 for receipt by the context component 226 for storage. In some implementations, monitoring can be performed to determine how well the submitted metadata correlates with the application 206 and if necessary, modifications in the used context parameter(s) can be made.

In some implementations, context can be shared by the developer submitting the application 206 to the advertisement distributor system 222. The context sharing component 228 can be used in submitting some or all of the application 206 for use in evaluating context. This can be done as part of a setup process so that the advertisement distributor system 222 can examine the application to determine the context of the content/ads to be forwarded. Examples of aspects that can be taken into account include, but are not limited to, textual content of a previous screen or page on the mobile device 204, a content of the entire application 206, and/or content of other view objects such as sibling objects.

Analysis of the application 206 can include analyzing the code (such as by static analysis), determining a general context of the application 206, or determining the specific context of one or more of the particular pages 208. This can require the context component 226 to determine which of the pages 208 is currently active in the mobile device 204. For example, this can be done using a version of the application 206 provided by the developer. If or when the application 206 is later updated, a revised version can be forwarded to the advertisement distributor system 222, for example using the context sharing component 228, so that the context can be updated if necessary.

As another example, context can be determined by providing that the developer can specify one or more hooks in the code of the application 206. In some implementations, the software development kit 214 and/or the platform 218 can provide such feature(s). For example, a global variable can be made to change state at one or more stages of the application 206. Such a variable can be read by the object 216, such as by a snippet of Java code.

Context parameter(s) for use in finding matching content such as advertisements can be stored in any of a variety of forms. For example, the context component 226 can store one or more keywords, categories, labels, topics, context information and/or any other kind of parameter for use by the advertisement distributor system 222.

The following is an example of how an implementation as described above can be used. A developer can create the application 206 intended for the mobile device 204 using the software development kit 214. Particularly, the application 206 can be created according to the platform 218 and can include the object 216. The developer can forward the application 206 to the mobile device for use, for example when the device 204 is initially sold or as a later update, such as by a download process. The developer can also provide context relating to the application 206, such as by submitting one or more keywords and/or providing a version of the application 206, using the context sharing component 228. One or more context parameters can be registered at the advertisement distributor system 222.

When a user operates the mobile device 204, content such as one or more ads 212 can be presented on the page(s) 208. The content can be selected for presentation by the advertisement distributor system 222 based on the context parameter(s). In some implementations, the user can interact with the ad(s) 212 in one or more ways, such as by clicking on the ad 212, performing a developer-specified combination of key presses (e.g., tapping a single key twice, or tapping two keys in rapid succession), or tapping on the ad on a touchscreen device.

Content such as advertisements can be retrieved in any of a variety of ways. In some implementations, content can be retrieved essentially according to an on-demand approach. For example, ads or other content can be requested from the advertisement distributor system 222 and forwarded from there for display. Such implementations can have the advantage that the ad that is displayed to the user can be very current to the particular state of the application 206 and/or the mobile device 204.

In some implementations, a pre-fetch approach can be used. For example, a developer can configure the application 206 such that multiple content portions such as ads are requested from the advertisement distributor system 222. The ads can be stored at a suitable location, such as on the mobile device 204 and/or on another computer device such as a server that communicates with the mobile device 204. At some point, such as by determination performed by the application 206, the ad(s) can be displayed on the mobile device 204, for example when it returns to an online mode after having been offline. The developer can provide for reporting of which contents/ads have been displayed, for example by incorporating a feature from the software development kit 214 into the application 206. Other approaches for fetching content can be used.

In some implementations, a new content portion such as the ad 212 can be presented when an activity that uses the class associated with content/ad presentation is displayed for the first time. As another example, the new ad/content can be presented when the activity has been removed from an activity stack in the mobile device 204. In yet another example, a content/ad can be presented if a previous ad/content has been displayed for a predetermined amount of time if the mobile device 204 continues to be active (e.g., if a backlight of the display on the device remains on). In some implementations, the developer can facilitate user-initiated refresh of content/ads via a class responsible for generating gallery views, for example to provide a carousel-style browsing of ads.

The software development kit 214 has been mentioned in examples above. In some implementations, the kit 214 can be extended or enhanced using a wizard in an interface directed toward publishers. For example, the advertisement distributor system 222 can provide a user interface where publishers can establish an account to become affiliated with an advertising program, and this interface can feature the wizard as a way for the developer(s) to customize the look and feel of content/ads to be displayed in connection with the application 206. In some implementations, this can be implemented as a self-service sign-up process for developers, for example to allow the opportunity to enhance their application offering with ads and/or other content. As another example, and assuming that users' privacy rights are taken into account, such an interface can provide reporting statistics on ad clicks, impressions, queries, revenue and/or other aspects to the advertisement distributor system 222.

Figure 3:
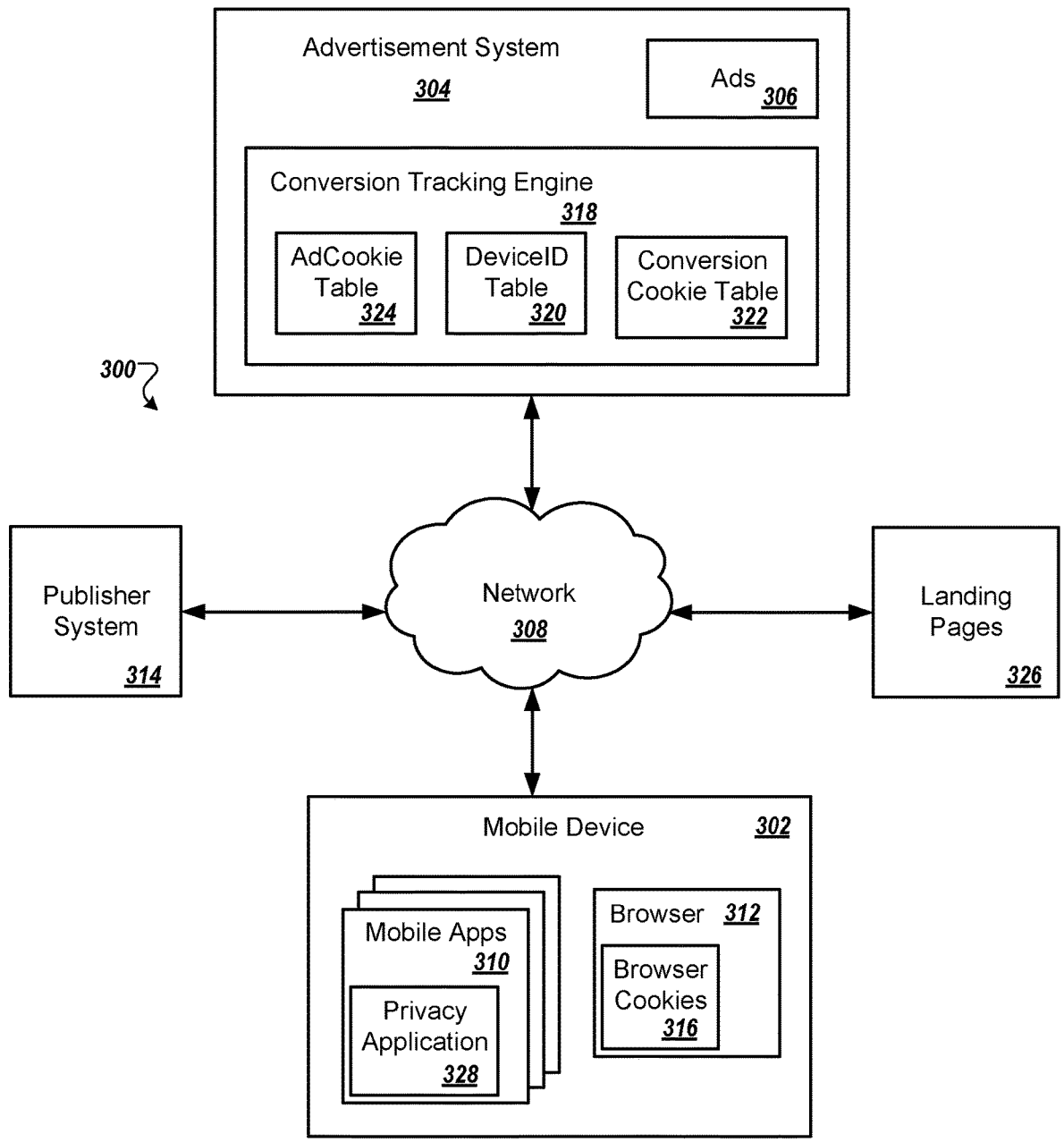
FIG. 3 is a block diagram of an example advertising system including a mobile device.

FIG. 3 is a block diagram of an example advertising system including a mobile device. A conversion tracking engine tracks ad conversions when an ad is selected in a mobile application on the mobile device and a conversion takes place in a browser on the mobile device, as described in greater detail below.

The system 300 includes a mobile device 302 which can request content from an advertisement system 304. Content can include one or more advertisements 306, web pages, video or audio streams, images, or other media, to name a few examples. The advertisement system 304 can serve the content, including the ads 306, to the mobile device 302 for presentation on a user interface of the mobile device 302.

The mobile device 302 can be a cellular telephone, a smartphone, a personal digital assistant, tablet device, or any other type of mobile device. In this example, the mobile device 302 can be used to make telephone calls, voice over internet protocol (VoIP) calls, and to browse the Internet (e.g., World Wide Web) or other type of network. The mobile device can receive user input, for example, from a touch screen interface, a keyboard, a trackball, or a stylus. The mobile device 302 can connect to the advertisement system 304 through a network 308, e.g., the Internet. In other implementations, the network 308 is a LAN, a WAN, or any combination thereof. The mobile device 302 can communicate using a wireless protocol, such as IEEE 802.11, WAP and/or Bluetooth.

In some implementations, one or more mobile applications 310 running on the mobile device 302 can request ads from the advertisement system 304. The mobile applications 310 can be created for the mobile device 302, for example, using the developer system 202 of FIG. 2. The types of mobile applications 310 can include games, utilities, news applications, and configuration tools, to name a few examples. The mobile applications 310 can be installed on the mobile device 302 before the device is initially sold by a manufacturer, or the mobile applications 310 can be installed onto the mobile device at a later time (e.g., through a download process from a mobile device application store). The mobile applications 310 can obtain a device identifier of the mobile device 302 through a native application programming interface ("API"). The device identifier can be, for example, a device identifier ("deviceID") for the device or other hardware identifier for the mobile device. The device identifier can be, for example, a unique alphanumeric identifier associated with the mobile device.

The mobile device 302 can include a browser 312 for browsing the Internet, e.g., the World Wide Web, or for accessing other content on a network (e.g., documents, images, and other forms of media). The browser 312 can request content from a publisher system 314, such as a search engine, for display on a user interface of the mobile device 302. In some implementations, one or more browser cookies 316 are stored on the browser 312 when content is served to the browser 312 by the publisher system 314. For example, the browser cookies 316 can be used to track the number of times content, such as a web page, is displayed on the user interface of the mobile device 302. The browser cookies 316 can include ad cookies used for ad tracking ads, e.g., previous impressions of particular ads presented in the browser 312. In some implementations, the browser cookies 316 can track a user session on a web site.

The publisher system 314 can request ads from the advertisement system 304, such as one of the ads 306. The publisher system 314 can send the ads 306 to the browser 312 such that the ads 306 are displayed in the user interface of the browser 312 along with the requested content (e.g., with a web page). The publisher system 314 can connect to the network 308 and communicate with the advertisement system 304 and the mobile device 302 through the network 308.

In some implementations, the browser 312 can request a web page from the advertisement system 304. The advertisement system 304 can send one or more of the ads 306 in addition to the requested web page to the browser 312. The browser 312 can combine the requested content with the received ads for presentation on a user interface of the mobile device 302. The advertisement system 304 can send one or more cookies to the mobile device 302 for storing information related to the requested web page and the ads 306. The mobile device 302 can store the cookies with the browser cookies 316. The cookies can be used to track which of the ads 306 were presented on the mobile device 302, advertising events, or a user session on a web site, to name a few examples.

The advertisement system 304 can include a conversion tracking engine 318 for tracking user interaction with the ads 306 presented in one or more of the mobile applications 310 and conversion in the browser 312. An advertiser can define a conversion as filling out a form, viewing a specific page, downloading a file, making a purchase, or signing up for a mailing list, to name a few examples.

In some implementations, the conversion tracking engine 318 uses unique device identifiers e.g., deviceIDs, received from mobile devices for tracking the ad conversions. The conversion tracking engine 318 can secure the device identifiers by mapping random identifiers to the device identifiers in a device identifier table 320. Thus, additional user privacy can be provided. Each row of the device identifier table 320 can be for a unique device identifier associated with a single mobile device.

When the conversion tracking engine 318 receives an input indicating a user interaction with one of the ads 306 in one of the mobile applications 310, the conversion tracking engine 318 can store or update a conversion cookie in a conversion cookie table 322. The conversion tracking engine 318 can query the device identifier table 320 to determine the identifier associated with the mobile device 302. If the device identifier table 320 does not include a row with the device identifier of the mobile device 302, the conversion tracking engine 318 can create a new record in the device identifier table 320. The conversion tracking engine 318 can use the device identifier and a conversion tracking identifier to identify the conversion cookie in the conversion cookie table 322.

Each row of the device identifier table 320 can include the conversion tracking IDs associated with the device identifier. Conversions can describe different responses to the ad by the user (e.g., clicking on the ad, interacting with the ad, performing an action on an advertiser web page associated with the ad). For example, when the conversion tracking engine 318 creates a new conversion cookie in the conversion cookie table 322, the conversion tracking engine 318 can add the conversion tracking identifier of the new conversion cookie to the device identifier table 320.

The device identifier table 320 can include privacy settings for each row to allow a user of the mobile device 302 to specify what information the conversion tracking engine 318 logs. In some implementations, the device identifier table 320 can track the applications that trigger advertising events with application IDs or some other mobile application identifier.

The conversion tracking engine 318 can create an ad cookie ("AdCookie") upon detection of user interaction with one of the ads 306. The conversion tracking engine 318 can store an ad cookie identifier ("AdCookieID") of the AdCookie in an AdCookie table 324 and map the AdCookieID to the device identifier of the mobile device 302. The conversion tracking engine 318 can send the AdCookie to the browser 312, and the browser 312 can store the AdCookie as one of the browser cookies 316.

When the conversion tracking engine 318 receives an input indicating an advertising event in one of the mobile applications 310 (e.g., a user selection of an ad in a mobile application), the conversion tracking engine 318 can receive a device identifier for the mobile device 302 as part of a browser request responsive to the advertising event. Advertising events can include presentation of an ad in one of the mobile applications 310, or user selection of one of the ads 306 (e.g., by clicking, tapping, or otherwise interacting with the ads), to name a few examples.

For example, when a user selects an ad, the device identifier can be sent to the advertisement system 304 along with other data associated with the advertising event (e.g., a particular URL, an identifier of the ad, and an identifier of the mobile application from which the ad was selected). The conversion tracking engine 318 can and create a conversion cookie in the conversion cookie table 322 associating the detected advertising event with the device identifier.

The conversion tracking engine 318 can create an AdCookie and store the AdCookieID and, optionally, the device identifier in a new row of the AdCookie table 324. The advertisement system 304 can send the AdCookie to the browser 312 for storage in the browser cookies 316.

The browser 312 can request a web page associated with the AdCookie (e.g., at a later point in time) and send the AdCookie to the conversion tracking engine 318. The conversion tracking engine 318 can receive information relating to the requested web page and using data from the conversion cookie table 322 determine the occurrence of a conversion. Thus, for example, a later action on a browser can be associated with an earlier ad selection in a mobile application.

In one example, one of the mobile applications 310 can present the ads 306 on the mobile device 302. For example, the mobile applications 310 can include a poker game application that presents ads while a user of the mobile device 302 plays the poker game application. If the user interacts with one of the ads 306, the poker game application can generate a request URL for a landing page 326 associated with the selected ad and send the URL request to the advertisement system 304. The URL request can include the device identifier of the mobile device 302.

The conversion tracking engine 318 can receive the URL request and use the device identifier from the URL request to determine the associated conversion cookie. The conversion tracking engine 318 can store a conversion cookie in the conversion cookie table 322. The conversion cookie can include an identifier of the poker game application, and/or information about the selected ad, to name a few examples. The conversion cookie can be stored in the conversion cookie table 322 and keyed off of a conversion tracking identifier associated with the device identifier. In other implementations, the conversion cookie table 322 can key conversion cookies with the conversion tracking identifier and device identifier. The conversion tracking engine 318 can store the conversion tracking identifier for the conversion cookie in the row of the device identifier table 320 associated with the device identifier of the mobile device 302.

In some implementations, the conversion cookie table 322 already includes a conversion cookie for the selected ad and device identifier. For example, the user of the mobile device 302 previously selected the ad and the conversion tracking engine 318 created a conversion cookie. In this example, later selection of the ad in the poker game application updates the conversion cookie associated with the ad located in the conversion cookie table 322.

Continuing the example, the poker game application can launch the browser 312 and direct the browser 312 to request the URL that includes the device identifier. The advertisement system 304 can receive the URL request and generate an AdCookie associated with the user/device browser. The conversion tracking engine 318 can use the device identifier and the AdCookieID for the AdCookie to create a record (e.g., a row) in the AdCookie table 324. The advertisement system 304 can send the generated AdCookie to the browser 312 and redirect the browser 312 to the landing page 326.

The browser 312 can display the landing page 326 on the user interface of the mobile device 302. The user can view information relating to the ad on the landing page 326 and interact with the information, e.g., by selecting to view product information or product price.

At a later time, for example as part of a later browser session, the browser 312 can request a page associated with the landing page 326 in response a user input and send a second URL request to the advertisement system 304. For example, the user can return to the landing page 326 at a later time (e.g., in a different browser session) in order to continue their previous interaction. The second URL request can include the AdCookieID of the AdCookie stored in the browser cookies 316 and associated with the landing page 326.

The advertisement system 304 can receive the second URL request with the AdCookieID and forward the AdCookieID to the conversion tracking engine 318. The conversion tracking engine 318 can query the AdCookie table 324 for the device identifier associated with the AdCookieID. The conversion tracking engine 318 can use the device identifier to determine a conversion tracking identifier associated with the AdCookieID. The conversion tracking engine 318 can retrieve the conversion cookie keyed with the conversion tracking identifier and device identifier from the conversion cookie table 322. Using the conversion cookie, the conversion tracking engine 318 can determine the application that displayed the ad (e.g., the poker game application) and the ad that was selected by the user (e.g., in the poker game application), and can log the event, for example, a user conversion. in particular, the conversion cookie stores the ad selection (e.g., click) information that identifies which selection can be attributed to the conversion event.

In some implementations, a user controls whether content (e.g., a landing page) associated with an ad selection in a mobile application is opened by the browser or by the mobile application. For example, the mobile application can present a prompt to a user after receiving input indicating user interaction with one of the ads. For example, the prompt can ask the user if the landing page 326 should be opened in the browser 312 or by the mobile application.

In other implementations, user selection of an ad can result in a probabilistic determination performed by the mobile application as to whether content is opened in the browser 312 or in the mobile application. The probabilistic determination can have a minimum probability that the content will be presented in the browser 312. For example, the probabilistic determination can be limited by a requirement to open the browser 312 after a specified number of ad clicks in the mobile application. The specified number of ad clicks can be related to the probability that the will be presented in the browser 312. For example, if the probability of the content being presented in the browser 312 is 10% and the browser 312 is not opened during the first nine ad clicks in the mobile application, the tenth selection of an ad in the mobile application will open content in the browser 312.

The content to be presented in response to an ad selection can be a landing page corresponding to one or more ads of a particular advertiser. The system 300 can include more than one landing page. For example, the system 300 can include a landing page for each of the ads 306. User interaction with the ads 306 can generate a URL request for the landing page associated with the selected ad. The URL request can be sent to the advertisement system 304, an advertiser system (not shown), or the publisher system 314, and the system can direct the application or browser requesting the URL to the landing page. In some implementations, an advertiser can use the publisher system 314 to store content, such as the landing page 326, for presentation to a user of the mobile device 302. In other implementations, an advertiser system includes the landing page 326 and other pages associated with the landing page (e.g., a website that includes the landing page 326).

The system 300 can include pages associated with the landing page 326. For example, the landing page 326 can be a general product information page. The system 300 can include pages associated with the general product information page, such as a detailed product information page, pages for similar products, a checkout page, or a survey page, to name a few examples.

The conversion tracking engine 318 can determine whether a conversion takes place based on a user interaction with the ad, the landing page 326, or user interaction with a page associated with the landing page 326. For example, a user can click on an ad for a television displayed in one of the mobile applications 310. The browser 312 can present the landing page 326 to the user showing information for the television that was displayed in the selected ad. The browser 312 can receive input from the user indicating that user added the television to the user's shopping cart and then purchased the television. The conversion tracking engine 318 can receive indication of the user purchase of the television and track the purchase as an ad conversion for the displayed ad.

The conversion tracking engine 318 can log user selection of the ads 306 and ad conversion data in the device identifier table 320, the conversion cookie table 322, the AdCookie table 324, or any combination thereof.

In some implementations, the mobile device 302 can include a privacy application 328 for managing log information stored on the advertisement system 304. When launched, the privacy application 328 can allow users to perform privacy management functions for the mobile device 302 including clearing ad tracking for mobile applications as well as opting out from ad tracking across mobile applications on the mobile device 302. In certain implementations, the privacy application 328 can provide application privacy management for each of the mobile applications 310 separately. In other implementations, the privacy application 328 can provide the same privacy settings for all of the mobile applications 310.

Figure 4:
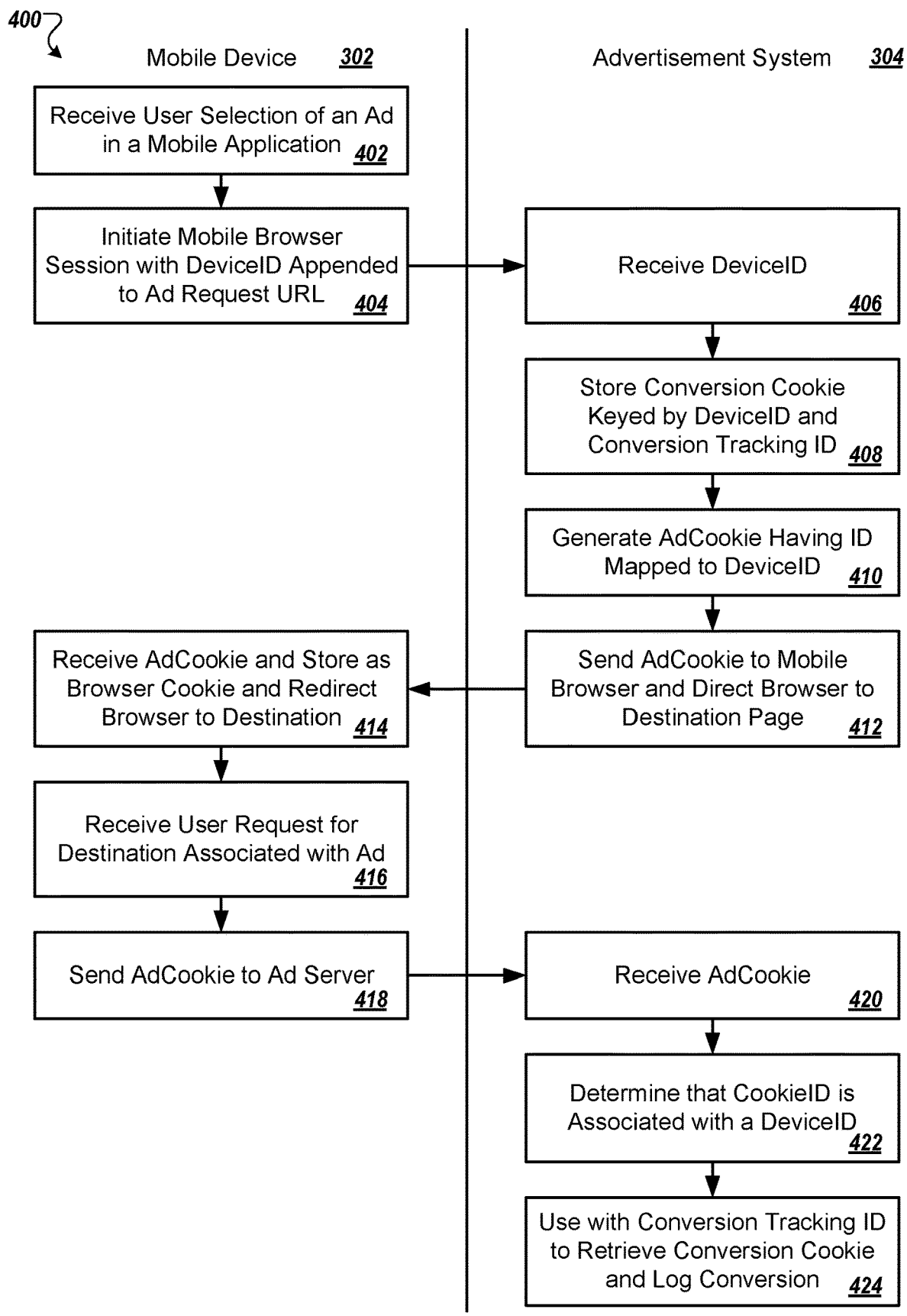
FIG. 4 is a flow chart of an example method for tracking conversions from a mobile application.

FIG. 4 is a flow chart of an example method 400 for tracking conversions on a mobile device. An ad can be presented to a user of the mobile device in a mobile application while the conversion event can take place in a browser on the mobile device at a later time, for example, in a separate user initiated browser session. A mobile device (e.g., the mobile device 302), an advertisement system (e.g., the advertisement system 304) and parts thereof will be referred to in the following as examples. The method 400 can be performed by one or more systems in conjunction with or instead of the mobile device 302 and the advertisement system 304.

Input is received indicating user selection of an advertisement in a mobile application (402). For example, a user can launch a mobile application (e.g., one of the mobile applications 310) on the mobile device, such as a shopping list application. The shopping list application can receive user input indicating products the user needs to purchase. In some implementations, the shopping list application can present ads to the user. The advertisement system can serve the ads to the shopping list application (e.g., from the ads 306), or alternatively, the ads can be provided by an ad system to a publisher associated with the mobile application, which then provides the ad to the mobile application of the user (e.g., separately or with other content to display). Ads can be selected for serving based on various criteria. For example, the ads can be for products or services related to the products in the shopping list.

In some implementations, the ads can be selected based on the geographic location of the mobile device. For example, if the user of the shopping list application is at a shopping mall walking by an outlet store, ads for the outlet store can be presented in the shopping list application. In certain implementations, log information (e.g., stored in the device identifier table 320 or the conversion cookie table 322) can be used for selection of the ads presented in the shopping list application. For example, the advertisement system can select ads that the user of the mobile device is determined to be likely to interact with based on previous interaction with ads.

The user of the mobile device can select an ad displayed in the shopping list application, and the shopping list application can receive indication of the user selection of the ad. For example, the user can select an ad for art work.

A mobile browser session is initiated with the submission of an advertisement request URL that includes an appended device identifier (404). For example, the shopping list application can determine a URL request based on the selected ad and receive the device identifier of the mobile device through a mobile application native API. The shopping list application can initiate a mobile browsing session with an appended URL that includes the URL request and the device identifier.

The shopping list application can, for example, initiate the mobile browsing session by presenting a prompt to the user requesting permission to launch a browser (e.g., the browser 312) on the mobile device. The browser can receive the appended URL from the shopping list application and send a request to the advertisement system for a page associated with the appended URL.

In other implementations, the shopping list application can automatically launch the browser without prompting the user. For example, the shopping list application can be programmed to open ad clicks or URL requests directly in the browser. In another example, the user can define settings in the shopping list application permitting the shopping list application to launch the browser upon receiving indication of user interaction with an ad or a URL.

In some implementations, the shopping list application can probabilistically determine whether to launch the browser in response to receiving indication of the user selecting an ad as described above. For example, the shopping list application can use a probabilistic algorithm to determine whether to launch the browser. The probabilistic algorithm can be programmed to launch the browser after the shopping list application receives a specific number of ad clicks without launching the browser. For example, the probabilistic algorithm can receive indication from the displayed ad that the browser should be launched at least 25% of the time. If the shopping list application receives three ad clicks without opening the browser, upon receiving the fourth ad click, the shopping list application will launch the browser. The shopping list application has a 25% chance of opening the browser for each of the first three ad clicks. If the browser opens during one of the clicks, the probabilistic algorithm starts the count again (e.g., the browser must be opened during one of the next four ad clicks).

The probabilistic algorithm can, for example, keep track of the number of clicks for each ad, with a requirement that the browser is launched after, at most, a specific number of ad clicks, if not earlier. For example, the shopping list application can present two ads to the user, advertisement A and advertisement B. Advertisement A can have a probability of launching in a mobile browser at least 33% of the time, and advertisement B can have a probability of launching in a mobile browser at least 20% of the time. The user can click on advertisement A twice and advertisement B four times without launching the browser 312. Once the user clicks on advertisement A for the third time or advertisement B for the fifth time, the shopping list application will launch the browser. Alternatively, the probabilistic algorithm can determine to launch the browser after either the first or second click on the advertisement A or one of the first four selections of advertisement B.

The device identifier is received (406). For example, the advertisement system can receive the appended URL request generated by the shopping list application (e.g., as sent by the initiated mobile browser). The advertisement system can include a conversion tracking engine (e.g., conversion tracking engine 318) that can extract the device identifier from the appended URL request.

In some implementations, the conversion tracking engine receives a URL request including a device identifier from the shopping list application for creation of a conversion cookie. In some implementations, the conversion tracking engine receives a URL request including a device identifier from the browser for creation of an AdCookie.

A conversion cookie keyed by the device identifier and a conversion tracking identifier is stored (408). For example, the conversion tracking engine can create a conversion cookie using the device identifier extracted from the URL request sent by the shopping list application. In some implementations, the URL request can include the identifier of the shopping list application and an event identifier. The conversion cookie can include fields for the device identifier, conversion tracking identifier, application identifier of the shopping list application, the identifier of the selected ad, and an event identifier, to name a few examples. The conversion tracking engine can store the conversion cookie in a conversion cookie table (e.g., the conversion cookie table 322) keyed by the conversion tracking identifier and the device identifier.

In some implementations, the conversion cookie can include a random identifier field instead of the device identifier field, and conversion cookies can be stored in the conversion cookie table keyed by random identifier and conversion tracking identifier. The conversion tracking engine can query a device identifier table (e.g., the device identifier table 320) for a row associated with the device identifier in order to retrieve the random identifier mapped to the device identifier. If the device identifier table does not include a record for the device identifier, the conversion tracking engine can create a new row for the device identifier in the device identifier table and generate a random identifier for the new row.

In some implementations, the conversion tracking engine can apply a function to received device identifiers and store the output identifier in the device identifier table, the conversion cookie table, and/or an AdCookie table (e.g., the AdCookie table 324). For example, the conversion tracking engine can store the output identifier in the conversion cookie table and the AdCookie table without using the device identifier table. In anther example, the conversion tracking engine can store the output identifier in the device identifier table in order to increase the security of the device identifier and user privacy.

An AdCookie is generated with an AdCookieID mapped to the device identifier (410). For example, the advertisement system can receive the URL request from the browser and generate an AdCookie with an AdCookieID. The conversion tracking engine can map the AdCookieID to the device identifier in the AdCookie table.

The AdCookie is sent to the mobile browser, and the mobile browser is directed to a destination page (412). For example, the advertisement system can determine a destination page (e.g., the landing page 326) associated with the selected ad. The advertisement system can send the AdCookie to the browser and redirect the browser to the destination page address.

The AdCookie is received and stored as a mobile browser cookie and the mobile browser is redirected to a destination page (414). For example, the mobile device can receive the AdCookie from the advertisement system and store the AdCookie as a browser cookie (e.g., as one of the browser cookies 316). The destination page can present information related to the selected ad (e.g., information relating to a specific piece of art) to the user of the mobile device.

A user request is received for a destination associated with the selected advertisement (416). For example, the browser can receive input from the user directing the browser to open a link on the destination page. The link can open a page associated with the destination page, such as a page that provides additional information on the product or services displayed in the selected ad. For example, the selected link can direct the browser to a page describing background information for the piece of art, or the availability of the art piece for purchase. In another example, the browser can receive a user request to add the piece of art to the user's shopping cart or to purchase the piece of art. The browser can receive the user request for an associated page during the same browsing session that the destination page was presented to the user or during a different browsing session (e.g., a second browsing session). The second browsing session can be later in the day, a week later, or twenty days later, to name a few examples.

The AdCookie is sent to the advertisement server (418). For example, the browser receives a user request for a destination associated with the selected ad and can request the page from a publisher system (e.g., the publisher system 314). The browser can send the AdCookie stored in the browser cookies to the publisher system with the page request. The publisher system can forward the AdCookie to the advertisement system. In other implementations, the browser can request the destination page from the advertisement system and send the AdCookie with the request to the advertisement system.

The AdCookie is received (420). For example, the advertisement system receives the AdCookie from the publisher system. In other implementations, the advertisement system receives the AdCookie from the mobile device.

An association between the AdCookieID and a device identifier is determined (422). For example, the conversion tracking engine can query the AdCookie table for the device identifier associated with the AdCookieID.

The device identifier is used with a conversion tracking identifier to retrieve a conversion cookie and log the conversion (424). For example, the conversion tracking engine can use the device identifier to determine the conversion tracking identifier in the device identifier table associated with the AdCookie. The conversion tracking engine can retrieve a conversion cookie from the conversion cookie table using the device identifier and the conversion tracking identifier.

In some other implementations, the conversion tracking engine can use the conversion tracking identifier and optionally the device identifier, to retrieve the conversion cookie from the conversion cookie table. The retrieved conversion cookie can include information about the selected ad and the application that presented the ad to the user. The conversion cookie can be used with the AdCookie and conversion event to log the conversion in the conversion cookie table, or another table or database on the advertisement system.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of associating user activity across applications that do not share a cookie space, comprising:
    obtaining, by one or more computers and through an application programming interface (APJ) to a first mobile application, interaction data indicating user interaction with a given content item presented in the first mobile application executing on a client device, the obtaining comprising causing the client device to:
        generate, in response to the user interaction with the given content item, a request URL that encodes information describing an identity of the client device and a context of the user interaction with the given content item within the first mobile application; and
        invoke a browser of the client device to submit, to the one or more computers, the request URL that encodes the information describing the identity of the client device and the context of the user interaction with the given content item, wherein the browser is different from the first mobile application and does not share a cookie space with the first mobile application;
    creating, by the one or more computers and in a database, a record associating presentation of the given content item and the user interaction with the given content item in the first mobile application with a unique identifier corresponding to a client device executing the first mobile application;
    after creating the record in the database, obtaining, by the one or more computers and through an API to a second independent mobile application that does not share a cookie space with the first mobile application, conversion data indicating that a user conversion occurred in the second independent mobile application, wherein the second independent mobile application is the browser or another mobile application different from the first mobile application:
    identifying, by the one or more computers and within the conversion data, the unique identifier corresponding to the client device executing the first mobile application and indicated in the record; and
    determining, in response to identifying the unique identifier indicated in the record within the conversion data and without a shared cookie space between the first mobile application and the second independent mobile application, that the user conversion in the second independent mobile application is attributable to one or more of the presentation of the given content item in the first mobile application or the user interaction with the given content item presented in the first mobile application.

2. The method of claim 1, wherein invoking the browser of the client device comprises making a probabilistic determination to launch the browser and submit the request URL to the system one or more computers.

3. The method of claim 2, wherein the probabilistic determination is based on a number of user interactions detected within a user interface of the first mobile application.

4. The method of claim 1, wherein the context of the user interaction with the given content item includes information describing at least an identity of the given content item and an identity of the first mobile application.

5. The method of claim 1, further comprising generating a content item cookie based on the interaction data, wherein the content item cookie includes a content item cookie identifier that the one or more computers have mapped to a device identifier for the mobile client device.

6. The method of claim 5, further comprising storing the content item cookie in a cookie space of the second independent mobile application that is not shared with the first mobile application, wherein the one or more computers use the content item cookie to identify information about the user interaction with the given content item in the first mobile application when the conversion data is obtained.

7. A non-transitory computer-readable medium having instructions stored thereon that, when executed by one or more processors of one or more computers, cause the one or more processors to perform operations comprising:

obtaining, through an application programming interface (API) to a first mobile application, interaction data indicating user interaction with a given content item presented in the first mobile application executing on a client device, the obtaining comprising causing the client device to:
  generate, in response to the user interaction with the given content item, a request URL that encodes information describing an identity of the client device and a context of the user interaction with the given content item within the first mobile application; and
  invoke a browser of the client device to submit, to the one or more computers, the request URL that encodes the information describing the identity of the client device and the context of the user interaction with the given content item, wherein the browser is different from the first mobile application and does not share a cookie space with the first mobile application;
creating, in a database, a record associating presentation of the given content item and the user interaction with the given content item in the first mobile application with a unique identifier corresponding to a client device executing the first mobile application;
after creating the record in the database, obtaining, through an API to a second independent mobile application that does not share a cookie space with the first mobile application, conversion data indicating that a user conversion occurred in the second independent mobile application, wherein the second independent mobile application is the browser or another mobile application different from the first mobile application:
identifying, within the conversion data, the unique identifier corresponding to the client device executing the first mobile application and indicated in the record; and
determining, in response to identifying the unique identifier indicated in the record within the conversion data and without a shared cookie space between the first mobile application and the second independent mobile application, that the user conversion in the second independent mobile application is attributable to one or more of the presentation of the given content item in the first mobile application or the user interaction with the given content item presented in the first mobile application.

8. The non-transitory computer-readable medium of claim 7, wherein invoking the browser of the client device comprises making a probabilistic determination to launch the browser and submit the request URL to the system one or more computers.

9. The non-transitory computer-readable medium of claim 8, wherein the probabilistic determination is based on a number of user interactions detected within a user interlace of the first mobile application.

10. The non-transitory computer-readable medium of claim 7, wherein the context of the user interaction with the given content item includes information describing at least an identity of the given content item and an identity of the first mobile application.

11. The non-transitory computer-readable medium of claim 7, wherein the instructions cause the one or more processors to perform operations further comprising generating a content item cookie based on the interaction data, wherein the content item cookie includes a content item cookie identifier that the one or computers have mapped to a device identifier for the mobile client device.

12. The non-transitory computer-readable medium of claim 11, wherein the instructions cause the one or more processors to perform operations further comprising storing the content item cookie in a cookie space of the second independent mobile application that is not shared with the first mobile application, wherein the one or more computers use the content item cookie to identify information about the user interaction with the given content item in the first mobile application when the conversion data is obtained.

13. A system comprising:
one or more data storage device that store instructions; and
one or more processors, of one or more computers, configured to interact with the data storage device and execute instructions that cause the one or more processors to perform operations comprising:
  obtaining, through an application programming interface (APJ) to a first mobile application, interaction data indicating user interaction with a given content item presented in the first mobile application executing on a client device, the obtaining comprising causing the client device to:
    generate, in response to the user interaction with the given content item, a request URL that encodes information describing an identity of the client device and a context of the user interaction with the given content item within the first mobile application; and
    invoke a browser of the client device to submit, to the one or more computers, the request URL that encodes the information describing the identity of the client device and the context of the user interaction with the given content item, wherein the browser is different from the first mobile application and does not share a cookie space with the first mobile application;
  creating, in a database, a record associating presentation of the given content item and the user interaction with the given content item in the first mobile application with a unique identifier corresponding to a client device executing the first mobile application;
  after creating the record in the database, obtaining, through an API to a second independent mobile application that does not share a cookie space with the first mobile application, conversion data indicating that a user conversion occurred in the second independent mobile application, wherein the second independent mobile application is the browser or another mobile application different from the first mobile application:
  identifying, within the conversion data, the unique identifier corresponding to the client device executing the first mobile application and indicated in the record; and
  determining, in response to identifying the unique identifier indicated in the record within the conversion data and without a shared cookie space between the first mobile application and the second independent mobile application, that the user conversion in the second independent mobile application is attributable to one or more of the presentation of the given content item in the first mobile application or the user interaction with the given content item presented in the first mobile application.

14. The system of claim 13, wherein invoking the browser of the client device comprises making a probabilistic determination to launch the browser and submit the request URL to the system one or more computers.

15. The system of claim 14, wherein the probabilistic determination is based on a number of user interactions detected within a user interface of the first mobile application.

16. The system of claim 13, wherein the context of the user interaction with the given content item includes information describing at least an identity of the given content item and an identity of the first mobile application.

17. The system of claim 13, wherein the instructions cause the one or more processors to perform operations further comprising generating a content item cookie based on the interaction data, wherein the content item cookie includes a content item cookie identifier that the one or more computers have mapped to a device identifier for the client device.

18. The system of claim 17, wherein the instructions cause the one or more processors to perform operations further comprising storing the content item cookie in a cookie space of the second independent mobile application that is not shared with the first mobile application, wherein the one or more computers use the content item cookie to identify information about the user interaction with the given content item in the first mobile application when the conversion data is obtained.

* * * * *